United States Patent
Inagaki (10) Patent No.: US 10,185,292 B2
(45) Date of Patent: Jan. 22, 2019

(54) MANUFACTURING MANAGEMENT APPARATUS WHICH REDUCES OPERATIONAL LOAD OF MANUFACTURING MACHINES

(71) Applicant: FANUC CORPORATION, Yamanashi (JP)

(72) Inventor: Shougo Inagaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 91 days.

(21) Appl. No.: 15/491,746

(22) Filed: Apr. 19, 2017

(65) Prior Publication Data
US 2017/0308043 A1    Oct. 26, 2017

(30) Foreign Application Priority Data
Apr. 26, 2016   (JP) .................................. 2016-088387

(51) Int. Cl.
G05B 13/02    (2006.01)

(52) U.S. Cl.
CPC .. G05B 13/021 (2013.01); *G05B 2219/23102* (2013.01); *Y02P 90/02* (2015.11); *Y02P 90/30* (2015.11)

(58) Field of Classification Search
CPC ............................... G05B 13/021; Y02P 90/02
See application file for complete search history.

(56) References Cited

U.S. PATENT DOCUMENTS

| 5,084,826 | A | * | 1/1992 | Hariki .............. G05B 19/41815 700/248 |
| 5,086,262 | A | * | 2/1992 | Hariki ................... B25J 9/1682 318/562 |
| 2006/0217841 | A1 | * | 9/2006 | Matsumoto ........... B25J 9/1669 700/248 |
| 2017/0212544 | A1 | * | 7/2017 | Nunez Caceres ......... H02J 3/18 |

FOREIGN PATENT DOCUMENTS

| JP | H4-300149 A | 10/1992 |
| JP | H8-18299 | 1/1996 |
| JP | H9-101813 | 4/1997 |
| JP | H10-34499 A | 2/1998 |
| JP | 3357143 B2 | 12/2002 |
| JP | 4571225 B1 | 10/2010 |
| JP | 2011-156598 A | 8/2011 |
| JP | 2015-13319 A | 1/2015 |
| JP | 2015-208811 A | 11/2015 |

* cited by examiner

*Primary Examiner* — Vincent H Tran
(74) *Attorney, Agent, or Firm* — Hauptman Ham, LLP (57) ABSTRACT

A cell control apparatus is provided with a load calculation part which calculates an operational load including at least one of average power consumption, maximum power consumption, and a variable indicating a component lifetime of a manufacturing cell in a predetermined period. The cell control apparatus includes an operation adjustment part which performs first control for reducing at least one of a speed and an acceleration at which the manufacturing machine drives and second control for adjusting a ratio of time of successive operations in such a manner as to reduce the operational load in such an extent that the number of products manufactured in the predetermined period is not changed.

3 Claims, 8 Drawing Sheets

| ID | ID GROUP | FIRST MANUFACTURING MACHINE | SECOND MANUFACTURING MACHINE | THIRD MANUFACTURING MACHINE | CONSTRAINT CONDITION |
|---|---|---|---|---|---|
| 1 | 1 | OPERATION A1 | OPERATION B1 | OPERATION C1 | |
| 2 | 1 | STANDBY | OPERATION B1 | STANDBY | |
| 3 | | STANDBY | | STANDBY | |
| 4 | 2 | OPERATION A2 | OPERATION B2 | STANDBY | START AFTER OPERATIONS A1, B1, C1 ARE COMPLETED OPERATIONS A2, B2 ARE UNCHANGEABLE |
| 5 | | STANDBY | STANDBY | OPERATION C2 | SECOND MANUFACTURING MACHINE MUST BE STOPPED |
| 6 | 3 | OPERATION A3 | STANDBY | | SECOND MANUFACTURING MACHINE MUST BE STOPPED |
| 7 | | OPERATION A3 | | STANDBY | |

| ID | ID GROUP | FIRST MANUFACTURING MACHINE | SECOND MANUFACTURING MACHINE | THIRD MANUFACTURING MACHINE | CONSTRAINT CONDITION |
|---|---|---|---|---|---|
| 1 | 1 | OPERATION A1 | OPERATION B1 | OPERATION C1 | |
| 2 | | | | | |
| 3 | | | | | |
| 4 | 2 | OPERATION A2 | OPERATION B2 | STANDBY | START AFTER OPERATIONS A1, B1, C1 ARE COMPLETED OPERATIONS A2, B2 ARE UNCHANGEABLE |
| 5 | 3 | STANDBY | STANDBY | OPERATION C2 | SECOND MANUFACTURING MACHINE MUST BE STOPPED |
| 6 | | | | | |
| 7 | | OPERATION A3 | | | SECOND MANUFACTURING MACHINE MUST BE STOPPED |

FIG. 7

| ID | ID GROUP | FIRST MANUFACTURING MACHINE | SECOND MANUFACTURING MACHINE | THIRD MANUFACTURING MACHINE | CONSTRAINT CONDITION |
|----|----------|------------------------------|-------------------------------|------------------------------|----------------------|
| 1  | 1        | OPERATION A1                 | OPERATION B1                  | OPERATION C1                 |                      |
| 2  |          |                              |                               |                              |                      |
| 3  |          |                              |                               |                              |                      |
| 4  | 2        | OPERATION A2                 | OPERATION B2                  | OPERATION C2                 |                      |
| 5  | 3        | OPERATION A3                 | OPERATION B3                  | STANDBY                      |                      |
| 6  |          |                              |                               |                              |                      |

FIG. 8

MANUFACTURING MANAGEMENT APPARATUS WHICH REDUCES OPERATIONAL LOAD OF MANUFACTURING MACHINES

RELATED APPLICATIONS

The present application claims priority to Japanese Patent Application No. 2016-088387 filed Apr. 26, 2016, the disclosures of which is hereby incorporated by reference herein in its entirety.

BACKGROUND OF THE INVENTION

1. Field of the Invention

The present invention relates to a manufacturing management apparatus which controls manufacturing machines.

2. Description of the Related Art

In conventional techniques, it has been known to manufacture a product by a manufacturing machine such as a robot and a machine tool. It has been known that in a manufacturing factory, operations such as machining and conveyance of a component are performed by a manufacturing machine, whereby productivity is improved. In the manufacturing factory, different types of manufacturing machines may be used, or identical type manufacturing machines may be used. When a plurality of manufacturing machines are used, the manufacturing machines share the operations in order to manufacture a product.

Japanese Unexamined Patent Publication No. 2015-208811A discloses a simulation device which simulates an operation of a robot system including a plurality of robots and optimizes an operation program. It is disclosed that in this simulation device, an execution time of the operation program is calculated for each line number of the operation program, and an operation waiting time is calculated based on the execution time.

Japanese Patent No. 4571225 discloses a power consumption estimation device which estimates power consumption of a robot system by performing a simulation of an operation of a robot while the robot is in the offline state.

Japanese Patent No. 3357143 discloses a robot control device which monitors a load applied to a drive mechanism of a robot and displays information on a lifetime of the robot.

SUMMARY OF THE INVENTION

In a manufacturing system for manufacturing a product, it is possible that a plurality of manufacturing machines manufacture the product. In the manufacturing machines, there are a large number of machines which are driven by electricity. Electricity is supplied to the manufacturing system in order to drive the manufacturing machines. In such a case, a maximum power supplied to the manufacturing system is preferably small. In other words, a peak value of power consumption of the manufacturing system is preferably small. Further, a total value of the power consumption in a predetermined period is preferably small. In other words, the average power consumption of the manufacturing system is preferably small.

Further, the manufacturing machines include a component in which when use is continued, a function decreases due to abrasion, deterioration, and the like. For example, a bearing and a speed reducer deteriorate when use is continued. It is known that a lifetime of such components changes depending on an operation process of the manufacturing machines. Thus, the manufacturing machines are preferably driven by such an operation process as to extend a component lifetime.

In the manufacturing system, the manufacturing machines perform or stop an operation in periods different form each other. Alternatively, the manufacturing machines can change a speed and the like even in the same operation. It is possible that the operator focuses on one manufacturing machine installed in the manufacturing system and reduces the peak value of the power consumption and the average power consumption in one manufacturing machine. Alternatively, the operator can select an operation so as to extend the component lifetime in one manufacturing machine.

However, there are cases in which even if a load such as the peak value of the power consumption, the average power consumption, and the component lifetime is optimized separately for each manufacturing machine, the load fails to be optimized in view of the entirety of the manufacturing system.

A manufacturing management apparatus of the present invention controls a manufacturing cell including a plurality of manufacturing machines. The manufacturing management apparatus is provided with a load information acquisition part which acquires load information including at least one of power consumption and information relating to a component lifetime of each manufacturing machine in a time-series manner. The manufacturing management apparatus is provided with a load calculation part which calculates an operational load including at least one of an average power consumption, a maximum power consumption, and a variable indicating a component lifetime of the manufacturing cell in a predetermined period based on the load information. The manufacturing management apparatus is provided with an operation adjustment part which performs first control for reducing at least one of a speed and an acceleration at which the manufacturing machines drive and second control for adjusting a ratio of time of successive operations in such a manner as to reduce the operational load in a range that the number of products manufactured in the predetermined period is not changed. The manufacturing management apparatus is provided with a transmission part which transmits a command on the operation adjusted by the operation adjustment part to the manufacturing machines.

In the invention as described above, the manufacturing management apparatus can include a manufacturing number acquisition part which receives a command on the number of products manufactured from a production planning apparatus which sets a manufacturing plan of products. The operation adjustment part sets the number of products manufactured in the predetermined period in such an extent that the number of products manufactured, as received by the manufacturing number acquisition part, can be manufactured, and perform the first control and the second control in such a manner as to reduce the operational load.

In the invention as described above, the manufacturing management apparatus is configured in such a manner as to control a plurality of manufacturing cells, and the operation adjustment part can perform the first control and the second control for each of the manufacturing cells in a separate manner.

DETAILED DESCRIPTION

Referring to FIG. 1 to FIG. 8, a manufacturing management apparatus according to an embodiment will be described. The manufacturing management apparatus according to the present embodiment controls a manufacturing cell including a plurality of manufacturing machines.

Figure 1:
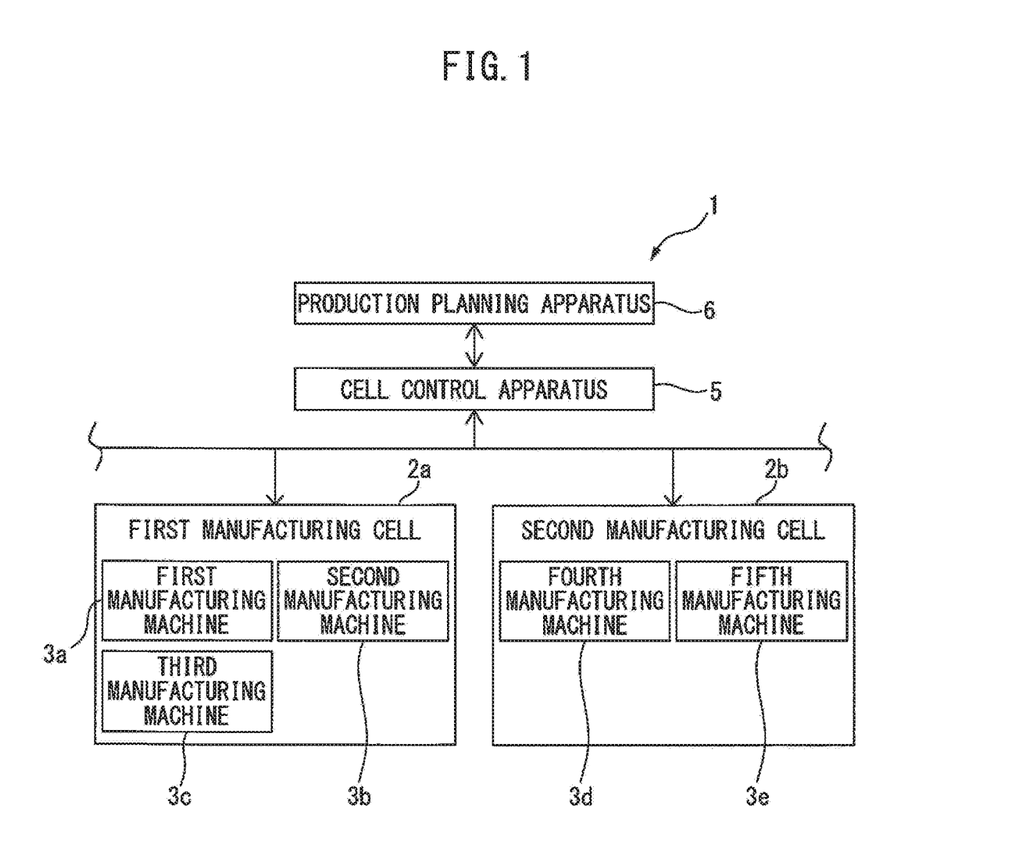
FIG. 1 is a block diagram of a manufacturing system according to an embodiment.

FIG. 1 is a block diagram of a manufacturing system according to the present embodiment. A manufacturing system 1 includes a plurality of manufacturing machines 3a to 3e. Each of the manufacturing machines 3a to 3e includes a robot which performs a predetermined operation such as a mounting or welding of a component. As the manufacturing machine, which is not limited to the robot, an arbitrary manufacturing machine which manufactures a product such as a machine tool that cuts a component, a printing machine, and a coating machine can be employed.

In the manufacturing system 1 according to the present embodiment, a plurality of manufacturing cells 2a, 2b are set. The manufacturing cell 2a, 2b is a group of a single manufacturing machine or a plurality of manufacturing machines for performing a predetermined operation. The manufacturing cell 2a according to the present embodiment includes the first manufacturing machine 3a, the second manufacturing machine 3b, and the third manufacturing machine 3c. Further, the manufacturing cell 2b according to the present embodiment includes the fourth manufacturing machine 3d and the fifth manufacturing machine 3e.

The manufacturing system 1 includes a cell control apparatus 5 which controls the manufacturing cells 2a, 2b. The cell control apparatus 5 functions as a manufacturing management apparatus which controls the manufacturing machines 3a to 3e. The cell control apparatus 5 includes an arithmetic processing device including a CPU (central processing unit), a RAM (random access memory), a ROM (read only memory), and the like which are connected to each other via a bus.

The manufacturing system 1 includes a production planning apparatus 6 which is configured in such a manner as to be capable of communicating with the cell control apparatus 5. The production planning apparatus 6 includes an arithmetic processing device including a CPU and the like. The production planning apparatus 6 according to the present embodiment sets a manufacturing plan of a product in a factory. In other words, the production planning apparatus 6 is configured in such a manner as to perform management of processes of the entire factory and management of production of the product.

In the present embodiment, the manufacturing cells 2a, 2b are installed in the factory which manufactures the product. On the other hand, the cell control apparatus 5 and the production planning apparatus 6 may be installed in a building different from the factory. For example, the cell control apparatus 5 may be installed in a separate building inside the site of the manufacturing factory. In such a case, the cell control apparatus 5 and the manufacturing machines 3a to 3e may be connected, for example, via a network such as an intranet. Further, the production planning apparatus 6 may be installed in an office located in an area distant from the manufacturing factory. For example, the production planning apparatus 6 is connected to the cell control apparatus 5 in such a manner as to be communicable with each other via a network such as an internet.

Figure 2:
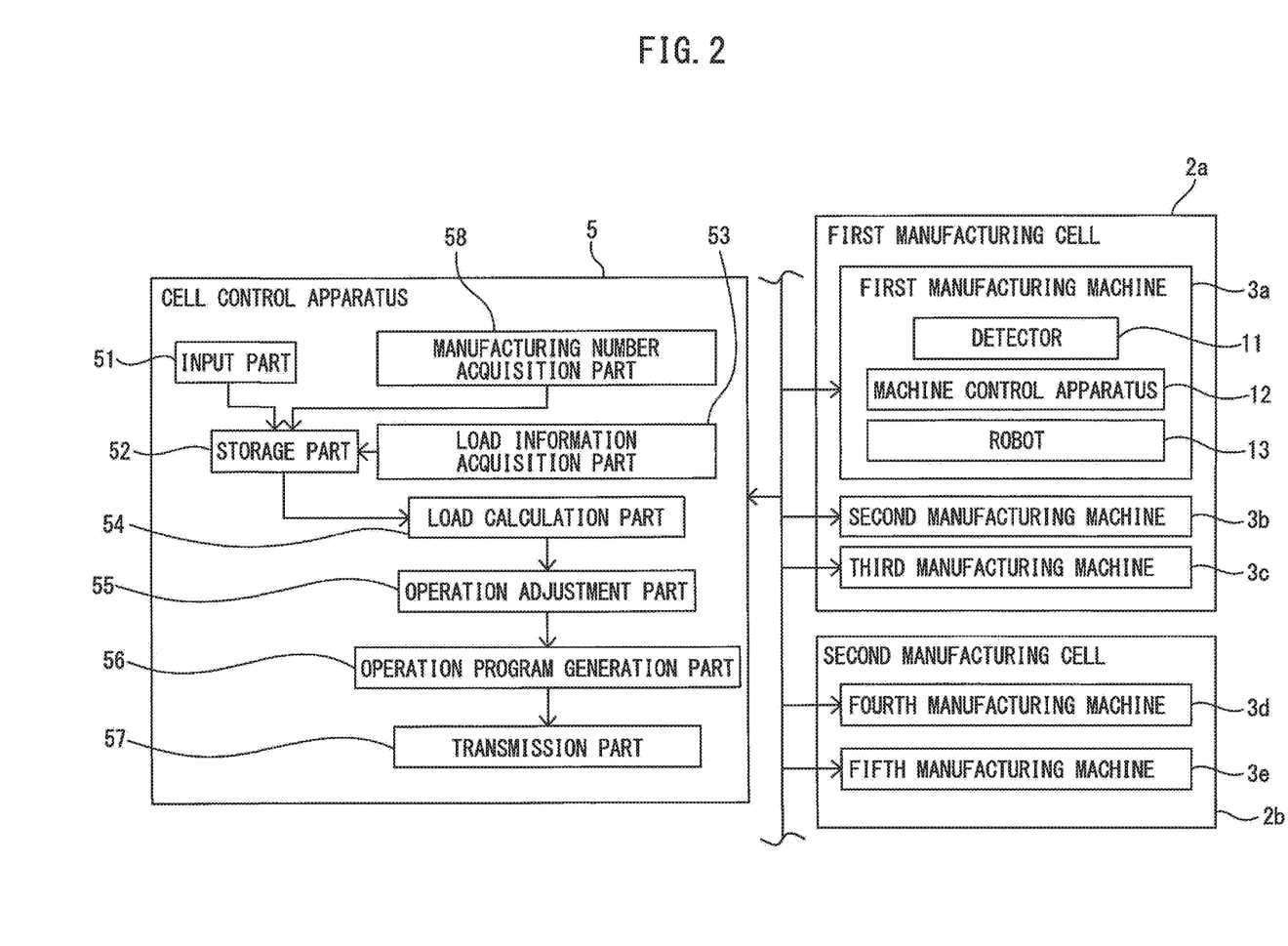
FIG. 2 is a block diagram of a cell control apparatus and manufacturing cells according to the embodiment.

In FIG. 2, a block diagram of the cell control apparatus and the manufacturing cells according to the present embodiment is illustrated. The first manufacturing machine 3a includes a robot 13 and a machine control apparatus 12 which controls an operation of the robot 13. Each of the manufacturing machines 3a-3e also includes the machine control apparatus 12 and the robot 13. The cell control apparatus 5 is configured in such a manner as to be mutually communicable with the machine control apparatus 12 attached to each of the manufacturing machines 3a to 3e.

Each of the manufacturing machines 3a to 3e includes a detector 11 which detects an operation state of the robot 13. The detector 11 detects power consumption and information relating to a component lifetime as described below and the like. The cell control apparatus 5 acquires an operation state of the manufacturing machines 3a to 3e from the machine control apparatus 12 and transmits a command on an operation of the robot 13 to the machine control apparatus 12.

The cell control apparatus 5 according to the present embodiment calculates an operational load in a predetermined period of each of the manufacturing cells 2a, 2b. The operational load includes an average power consumption, a maximum power consumption, and a variable indicating the component lifetime. In other words, the cell control apparatus 5 calculates at least one of the average power consumption, the maximum power consumption, and the variable indicating the component lifetime. The cell control apparatus 5 adjusts operations of the manufacturing machines in such a manner as to reduce the operational load.

The cell control apparatus 5 includes an input part 51. Examples of the input part 51 include an input device such as a keyboard. The operator can input the desired information to the cell control apparatus 5 through the input part 51. The cell control apparatus 5 includes a storage part 52 which stores information relating to a control of the manufacturing cells 2a, 2b.

The cell control apparatus 5 includes a load information acquisition part 53 which acquires load information including at least one of the power consumption and information relating to the component lifetime of each manufacturing machine. The load information acquisition part 53 according to the present embodiment acquires the load information for each predetermined time interval. The load information acquisition part 53 acquires the load information in a time-series manner. The load information acquired by the load information acquisition part 53 is stored in the storage part 52.

When the load information is the power consumption of the manufacturing machines 3a to 3e, a sensor which detects electricity supplied to the manufacturing machines can be attached to each of the manufacturing machines 3a to 3e as the detector 11. The load information acquisition part 53 can acquire the power consumption of the manufacturing machines 3a to 3e based on an output of the sensor which detects electricity.

Alternatively, a detector which detects a speed of a motor for operating the robot 13 and a torque sensor which detects a torque outputted by the motor can be provided as the detector 11. The load information acquisition part 53 may estimate the power consumption based on drive information of the motor such as the speed and the torque. Alternatively, the load information acquisition part 53 may calculate the power consumption based on an operation command transmitted by the machine control apparatus 12 to the robot 13.

The cell control apparatus 5 includes a load calculation part 54 which calculates the operational load based on the load information acquired by the load information acquisition part 53. The operational load includes at least one of the average power consumption, the maximum power consumption, and the variable indicating the component lifetime of the manufacturing cells 2a, 2b in a predetermined period.

The load calculation part 54 can acquire the power consumption of one manufacturing cell by adding the power consumption for each of the manufacturing machines 3a to 3e. The load calculation part 54 can calculate the maximum power consumption of one manufacturing cell in a predetermined period based on the power consumption of the manufacturing cells that is calculated for each predetermined time interval. Alternatively, the load calculation part 54 can calculate the average power consumption for each of the manufacturing cells 2a, 2b in a predetermined period. For example, the load calculation part 54 can calculate the average power consumption of the first manufacturing cell 2a based on the power consumption of the first manufacturing machine 3a, the power consumption of the second manufacturing machine 3b, and the power consumption of the third manufacturing machine 3c.

As the predetermined period, for example, a time in which one manufacturing cell performs an operation for one product can be illustrated. As the predetermined period, which is not limited to such a configuration, an arbitrary period can be employed. For example, the predetermined period may be set to be a time such as one day. Alternatively, a period in which a predetermined number of products are manufactured can be set as the predetermined period.

Herein, the variable indicating the component lifetime as the operational load will be described. A component of the manufacturing machines deteriorates as the manufacturing machines drive. For example, the manufacturing machines drive, whereby the component is abraded and deteriorated. When the component lifetime ends, exchanging the component is necessary. As the variable indicating the component lifetime, a time length which can be used under a predetermined condition, a variable indicating a degree of deterioration, or the like can be employed. In the present embodiment, a speed reducer will be described as the component of the robot by way of example.

As the variable indicating the component lifetime of the speed reducer, a rated lifetime ratio Rr1 can be illustrated. In the speed reducer, a lifetime can be determined based on an average torque of an output shaft. A torque sensor can be provided as the detector 11, whereby an average torque $T_{mp}$ applied to the speed reducer in the predetermined period can be calculated. The average torque $T_{mp}$ is multiplied by a speed reduction ratio R1 and a speed reduction efficiency η of the speed reducer so that a torque $T_{Omp}$ which is outputted from the output shaft of the speed reducer can be determined as expressed by equation (1).

$$T_{Omp} = T_{mp} \times R1 \times \eta \quad (1)$$

Next, a rotation angle detector is provided to the output shaft of the motor as the detector 11, whereby an average speed $n_m$ can be calculated. The average speed $n_m$ is multiplied by the reciprocal (1/R1) of the speed reduction ratio R1, whereby a rotation speed Nom of the output shaft of the speed reducer can be calculated. Then, a lifetime period $L_{10Rp}$ (Hour) of the speed reducer can be calculated by equation (2), using a rated lifetime period K (Hour) of the speed reducer, a rated torque $T_o$ (Kgf·m) of the speed reducer, and a rated rotation number $N_0$ (rpm) of the speed reducer.

$$L_{10Rp} = K \times \frac{N_0}{N_{0m}} \times \left(\frac{T_0}{T_{Omp}}\right)^{10/3} \quad (2)$$

Next, a time Tt' (Hour) is obtained from a total operation time Tt of the speed reducer (where fraction is discarded) and the total operation time Tt' is divided by the lifetime $L_{10Rp}$ of the speed reducer, whereby a rated lifetime ratio Rr1 (=Tt'/$L_{10Rp}$) can be calculated. It is indicated that the greater the rated lifetime ratio is, the nearer the end of the lifetime of the speed reducer is.

When the load calculation part 54 calculates the rated lifetime ratio Rr1 of the speed reducer as the variable indicating the component lifetime, the load information acquisition part 53 acquires the torque applied to the speed reducer and the rotation speed of the motor as the information relating to the component lifetime. The load calculation part 54 can calculate the rated lifetime ratio based on equation (1) and equation (2) as described above.

The cell control apparatus 5 includes an operation adjustment part 55 which adjusts an operation of the manufacturing machines 3a to 3e in such a manner as to reduce the operational load calculated by the load calculation part 54. The operation adjustment part 55 performs first control for reducing at least one of a speed and an acceleration at which the manufacturing machines 3a to 3e drive while reducing a standby time of the manufacturing machines 3a to 3e, as described below. Further, the operation adjustment part 55 performs second control for adjusting a ratio of time of the successive operations in such a manner as to reduce the operational load. The operation adjustment part 55 adjusts an operation of the manufacturing machines in such a manner as to reduce the operational load in such an extent that a number of products manufactured in the predetermined period is not changed. The first control and the second control will be later described in detail.

As the speed at which the manufacturing machines drive, a speed at a predetermined point on a part driven in the manufacturing machine can be illustrated. For example, when the manufacturing machines are robot devices, a robot changes a position and a posture with an elapse of the time. The operation adjustment part 55 can adjust a speed at which a tool tip end point of the robot device moves. Alternatively, when an end effector mounted to the robot drives, a speed at which the end effector drives corresponds to the speed at which the manufacturing machines drive. In addition, when the manufacturing machine is a machine tool, a relative position of a tool with respect to a workpiece changes with the elapse of the time in the machine tool. The operation adjustment part 55 can change a relative speed of the tool with respect to the workpiece. As the acceleration at which the manufacturing machines drive, acceleration at a predetermined point on a part driven in the manufacturing machine can be illustrated.

The cell control apparatus 5 includes an operation program generation part 56 which generates an operation program for performing an operation as adjusted by the operation adjustment part 55. The operation program generation part 56 generates the operation program for driving each of the manufacturing machines 3*a* to 3*e*. In such an occasion, the operation program generation part 56 generates the operation program based on the speed and the acceleration of an operation of the manufacturing machines that are determined by the operation adjustment part 55.

The cell control apparatus 5 includes a transmission part 57 which transmits the operation program generated by the operation program generation part 56 to the machine control apparatus 12 of each of the manufacturing machines 3*a* to 3*e*. In other words, the transmission part 57 transmits an operation command relating to the operation as adjusted by the operation adjustment part 55 to each of the manufacturing machines 3*a* to 3*e*. The manufacturing machines 3*a* to 3*e* drive in accordance with the operation program as received.

Note that in the present embodiment, the operation adjustment part 55 adjusts at least one of the speed and the acceleration. There are cases in which the operation program includes a file in which the operation of the manufacturing machine is determined and a file in which the speed or the acceleration corresponding to each operation is recorded. In such a case, the operation program generation part 56 can change the recording of the file in which the speed or the acceleration is recorded. The transmission part 57 can transmit the file in which the speed or the acceleration is recorded as the operation command to the machine control apparatus 12 of the manufacturing machines 3*a* to 3*e*.

Next, the first control performed by the operation adjustment part 55 according to the present embodiment will be described. Herein, the first manufacturing cell 2*a* will be described from between the manufacturing cells 2*a*, 2*b* by way of example. In the second manufacturing cell 2*b* as well, the operation of the manufacturing machines 3*d*, 3*e* can be adjusted by the control similar to that of the first manufacturing cell 2*a*.

Figure 3:
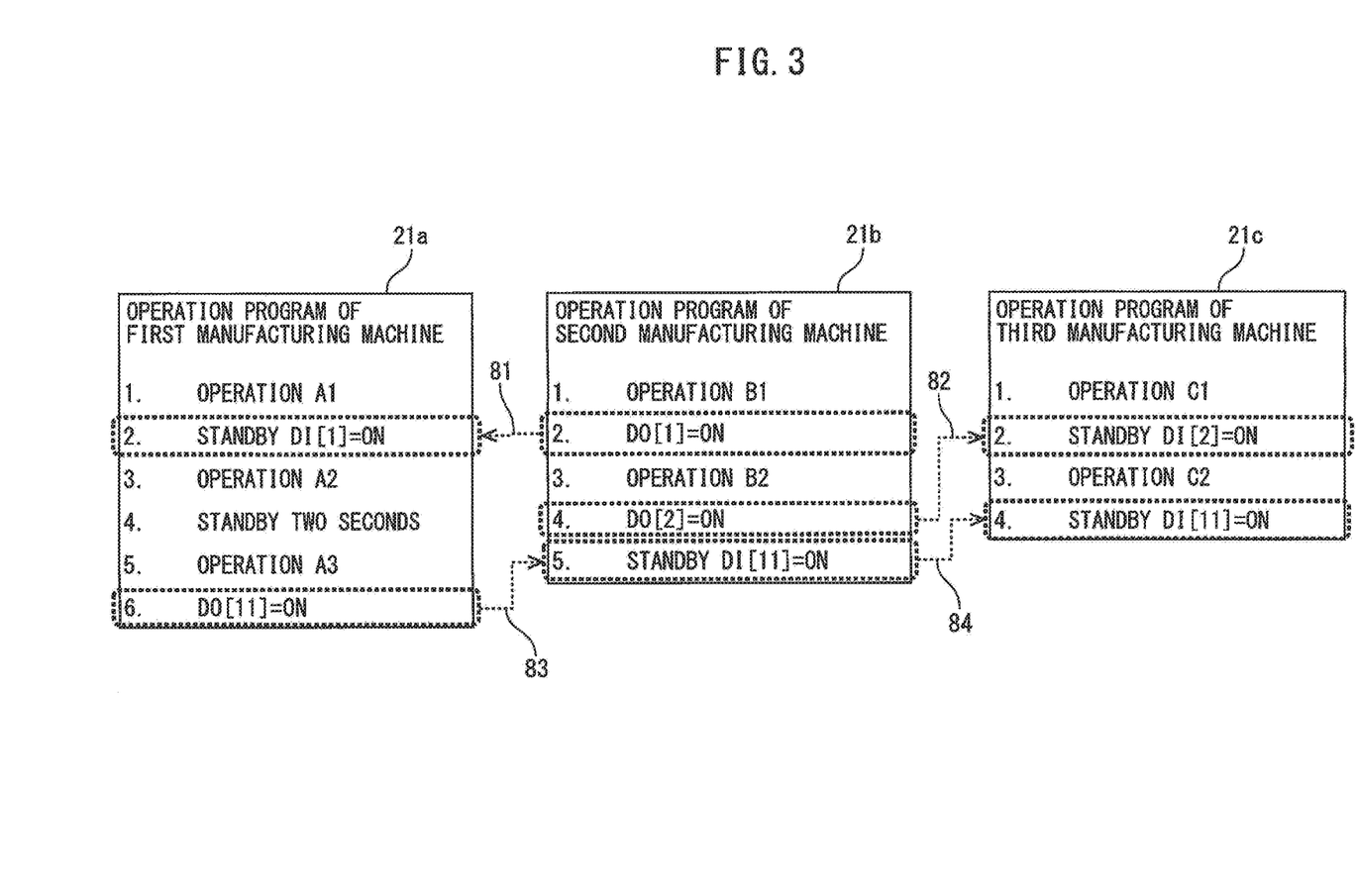
FIG. 3 is an operation program of first manufacturing machine, second manufacturing machine, and third manufacturing machine.

In FIG. 3, the operation programs of the first manufacturing machine, the second manufacturing machine, and the third manufacturing machine according to the present embodiment are illustrated. FIG. 3 illustrates a part of the operation program. Each operation program is created by the operator in advance. The number of products manufactured in the predetermined period in the manufacturing cells is determined by the operation program.

In an operation program 21*a* of the first manufacturing machine 3*a*, an "operation A1" indicates a command for performing the operation A1. A "standby DI[1]=ON" indicates a command for standing by until DO[1] turns ON. Then, "DO[11]=ON" indicates a command for turning DO[11] into ON. Further, a "standby two seconds" indicates a command for maintaining a stop state without operating for two seconds. In other words, the first manufacturing machine 3*a* stops for two seconds without operating after an operation A2 terminates. An operation program 21*b* of the second manufacturing machine 3*b* and an operation program 21*c* of the third manufacturing machine 3*c* are configured by a similar command as well.

In the present embodiment, the operation of one manufacturing machine depends on the operation of the other manufacturing machine. In the manufacturing machines 3*a* to 3*c*, a start of the operation of one manufacturing machine relates to a stop of the operation of the other manufacturing machine. In an example as illustrated in FIG. 3, the first manufacturing machine 3*a* performs the operation A1, the second manufacturing machine 3*b* performs an operation B1, and the third manufacturing machine 3*c* performs an operation C1. In the second manufacturing machine 3*b*, DO[1] is changed into ON after the operation B1 terminates. The first manufacturing machine 3*a* stands by after the operation A1 terminates. As indicated by an arrow 81, DO[1] of the second manufacturing machine 3*b* turns ON, whereby DI[1] turns ON. The first manufacturing machine 3*a* performs the subsequent operation A2.

The third manufacturing machine 3*c* stands by after the operation C1 is performed. In the second manufacturing machine 3*b*, DO[2] turns ON after an operation B2 terminates. In the third manufacturing machine 3*c*, DI[2] turns ON as indicated by an arrow 82. Thereafter, the third manufacturing machine 3*c* performs an operation C2.

The second manufacturing machine 3*b* stands by after DO[2] is turned ON. The third manufacturing machine 3*c* stands by after the operation C2 terminates. Then, DO[11] turns ON after the first manufacturing machine 3*a* terminates an operation A3. As indicated by arrows 83, 84, DI[11] turns ON. In the second manufacturing machine 3*b* and the third manufacturing machine 3*c*, a control for standing by until DI[11] turns ON is performed.

Figure 4:
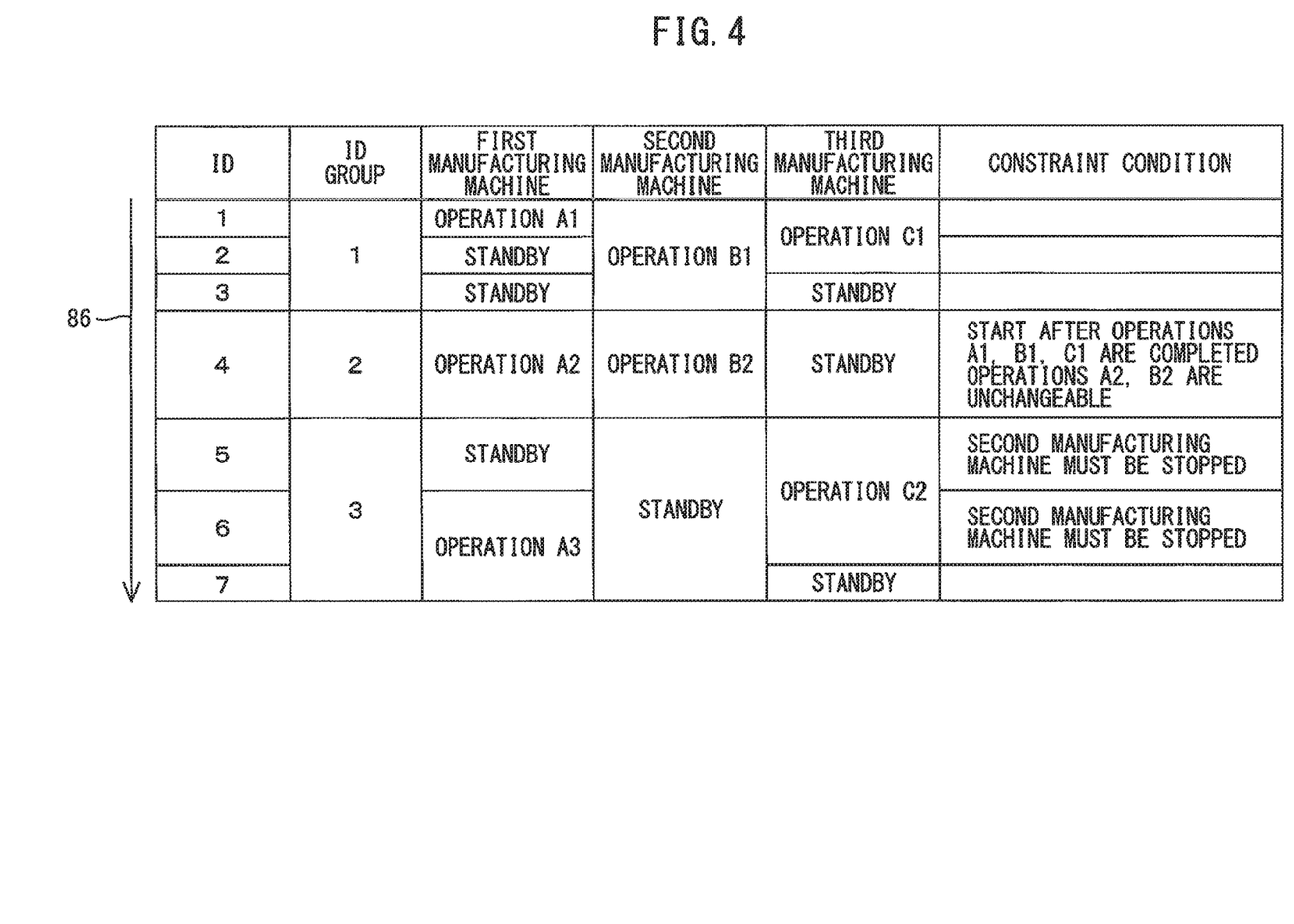
FIG. 4 is a table illustrating operations of the manufacturing machines in accordance with the operation program in FIG. 3.

In FIG. 4, an explanatory diagram of the operation of the manufacturing machines performed according to the operation program illustrated in FIG. 3 is illustrated. An arrow 86 indicates a time flow. For example, after performing the operation A1, the first manufacturing machine 3*a* stands by until the operation B1 of the second manufacturing machine 3*b* terminates. After performing the operation C1, the third manufacturing machine 3*c* stands by until the operation B2 of the second manufacturing machine 3*b* terminates. The operation adjustment part 55 according to the present embodiment provides an ID number relating to the operation using a time at which the operation of at least one manufacturing machine changes as a boundary. In an example as illustrated in FIG. 4, number one to number seven as the ID number are set.

Further, the operation adjustment part 55 detects in all the manufacturing machines a time at which the operation stops or the operation switches, and sets an ID group using such a time as a boundary. As the ID group, number 1 to number 3 are set. For example, first ID group includes the operation having the ID number of number 1 to number 3. In second ID group, the operation having the ID number of number 4 is set. Then, third ID group includes the operation having the ID number of number 5 to number 7. Thus, in the present embodiment, the three ID groups are set.

Further, in the present embodiment, in the operation of a part of the ID numbers, a constraint condition is set. The constraint condition is a condition to be followed when a control is performed. For example, the operation having the ID number of number 4 is started after all the operations A1, B1, C1 terminate. Further, in the operation having the ID number of number 4, the first manufacturing machine 3*a* and the second manufacturing machine 3*b* cooperatively performs one operation. Thus, adjusting the operation of the operation A2 and the operation B2 is prohibited. In other words, the operation A2 and the operation B2 having the ID number of number 4 is an operation which fails to change without being adjusted by the operation adjustment part. With respect to the operation as thus predetermined, the operation adjustment part 55 adjusts an operation time of each of the manufacturing machines 3*a* to 3*c*.

In the first control, the operation adjustment part 55 performs adjustment of the operation separately for each of the manufacturing machines 3a to 3c. The operation adjustment part 55 detects a standby state of the manufacturing machines. When the manufacturing machines operate before or after the standby state, the operation adjustment part 55 performs such a control as to reduce a speed of the operation and lengthen a time needed for the operation. The operation adjustment part 55 performs such a control as to reduce a standby time and lengthen a time for the operation. By such a control, the average power consumption and the maximum power consumption can be reduced. In other words, the component lifetime can be extended.

Figure 5:
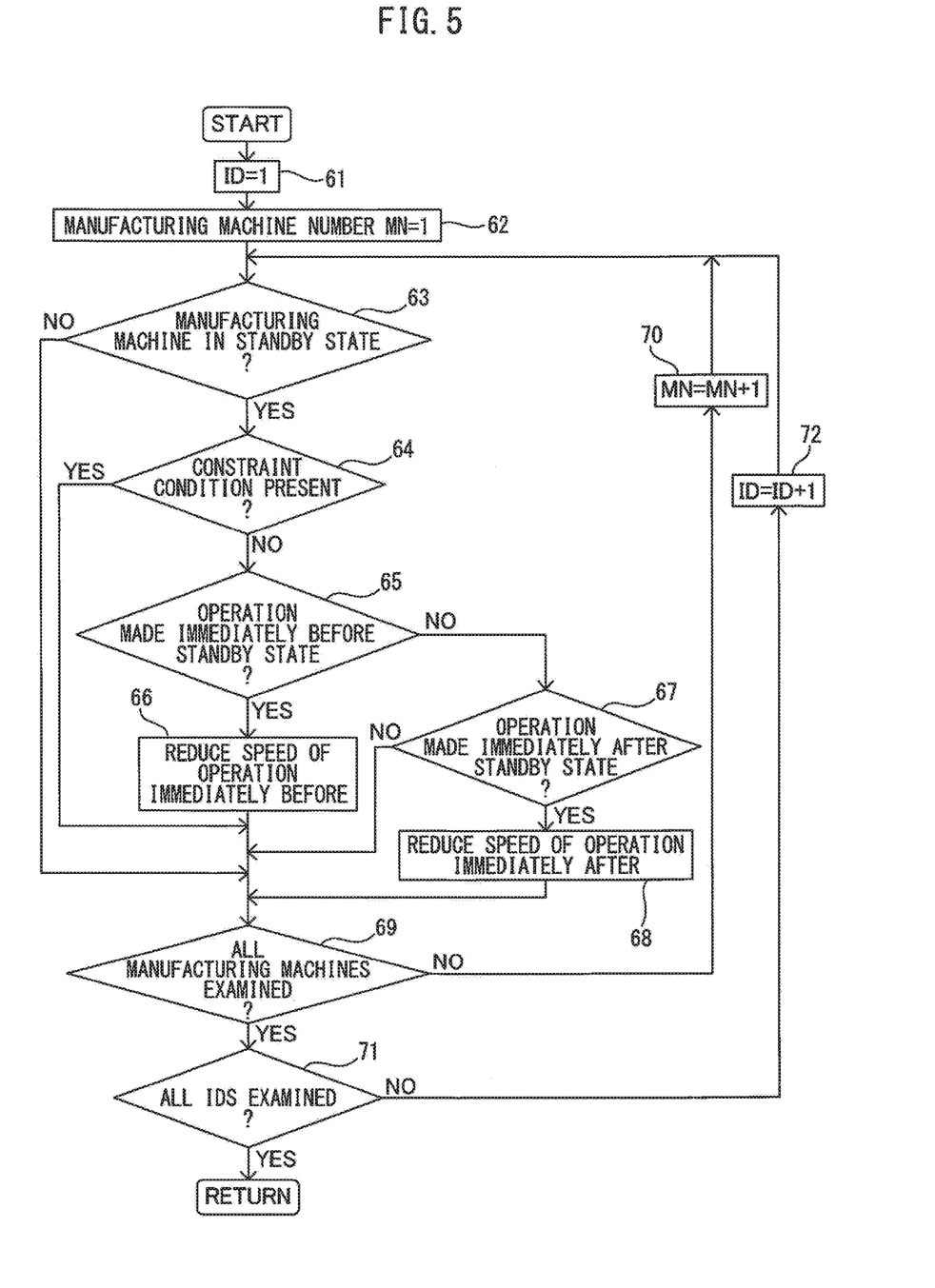
FIG. 5 is a flowchart of first control according to the embodiment.

In FIG. 5, the flowchart of the first control of the operation adjustment part according to the present embodiment is illustrated. Referring to FIG. 4 and FIG. 5, in step 61, the operation adjustment part 55 sets a variable ID as 1. In other words, the ID number of number 1 is selected. In step 62, the operation adjustment part 55 sets a number MN of the manufacturing machines as 1. In other words, the first manufacturing machine 3a is selected from among the manufacturing machines.

Next, in step 63, the operation adjustment part 55 determines whether or not the manufacturing machine as selected is in the standby state. For example, it is determined whether or not the first manufacturing machine is in the standby state in the ID number of number 1. In step 63, when the manufacturing machine is not in the standby state, the control proceeds to step 69. In step 63, when the manufacturing machine is in the standby state, the control proceeds to step 64.

In step 64, the operation adjustment part 55 determines whether or not there is the constraint condition with respect to the ID number and the manufacturing machine as selected. In step 64, when there is constraint by the constraint condition, the control proceeds to step 69. In step 64, when there is no constraint by the constraint condition, the control proceeds to step 65.

In step 65, the operation adjustment part 55 determines whether or not the manufacturing machine as selected operates immediately before the standby state. In step 65, when the manufacturing machine as selected operates immediately before the standby state, the control proceeds to step 66.

In step 66, the operation adjustment part 55 performs such a control as to reduce the speed of the operation immediately before the standby state. In the present embodiment, the operation adjustment part 55 reduces the speed of the operation of the manufacturing machine in such a manner as to perform the operation over the entire standby time. In other words, the operation adjustment part 55 reduces the speed of the operation of the manufacturing machine in such a manner that the standby time amounts to zero.

In step 65, when operation is not made immediately before the standby state, the control proceeds to step 67. In step 67, the operation adjustment part 55 determines whether or not the operation is made immediately after the standby state. In step 67, when the operation is made immediately after the standby state, the control proceeds to step 68.

In step 68, the operation adjustment part 55 performs such a control as to reduce the speed of the operation immediately after the standby state. In the present embodiment, the speed of the operation is reduced such that the operation is performed over the entire standby time. After the control in step 68 is performed, the control proceeds to step 69.

Alternatively, when the operation is not made immediately after the standby state in step 67, the control proceeds to step 69.

In step 69, the operation adjustment part 55 determines whether or not all the manufacturing machines corresponding to the ID numbers as currently selected have been examined. In an example herein, it is determined whether or not the controls from step 63 to step 68 has been performed with respect to all of the first manufacturing machine 3a, the second manufacturing machine 3b, and the third manufacturing machine 3c.

In step 69, when the examination has not been made with respect to a part of the manufacturing machines from among the manufacturing machines, the control proceeds to step 70. In step 70, one is added to the number MN of the manufacturing machine, and the process returns to step 63. In other words, the controls from step 63 to step 68 are performed with respect to the following manufacturing machine. After the first manufacturing machine is examined, the second manufacturing machine is examined. In step 69, when the examination with respect to all the manufacturing machines has been performed in the ID numbers as selected, the control proceeds to step 71.

In step 71, it is determined whether or not the examination has been made with respect to all the ID numbers. In step 71, when the examination has been made with respect to all the ID numbers, the control is terminated. In step 71, when an ID number with respect to which the examination is not made remains, the control proceeds to step 72.

In step 72, one is added to the ID number. In other words, an advance to a control relating to the operation of the following ID number is made in accordance with the time flow as indicated by the arrow 86. The control proceeds to step 63, and the examination of the manufacturing machine corresponding to the ID number as newly selected is performed. For example, the examination of the first manufacturing machine 3a, the second manufacturing machine 3b, and the third manufacturing machine 3c is performed.

Figure 6:
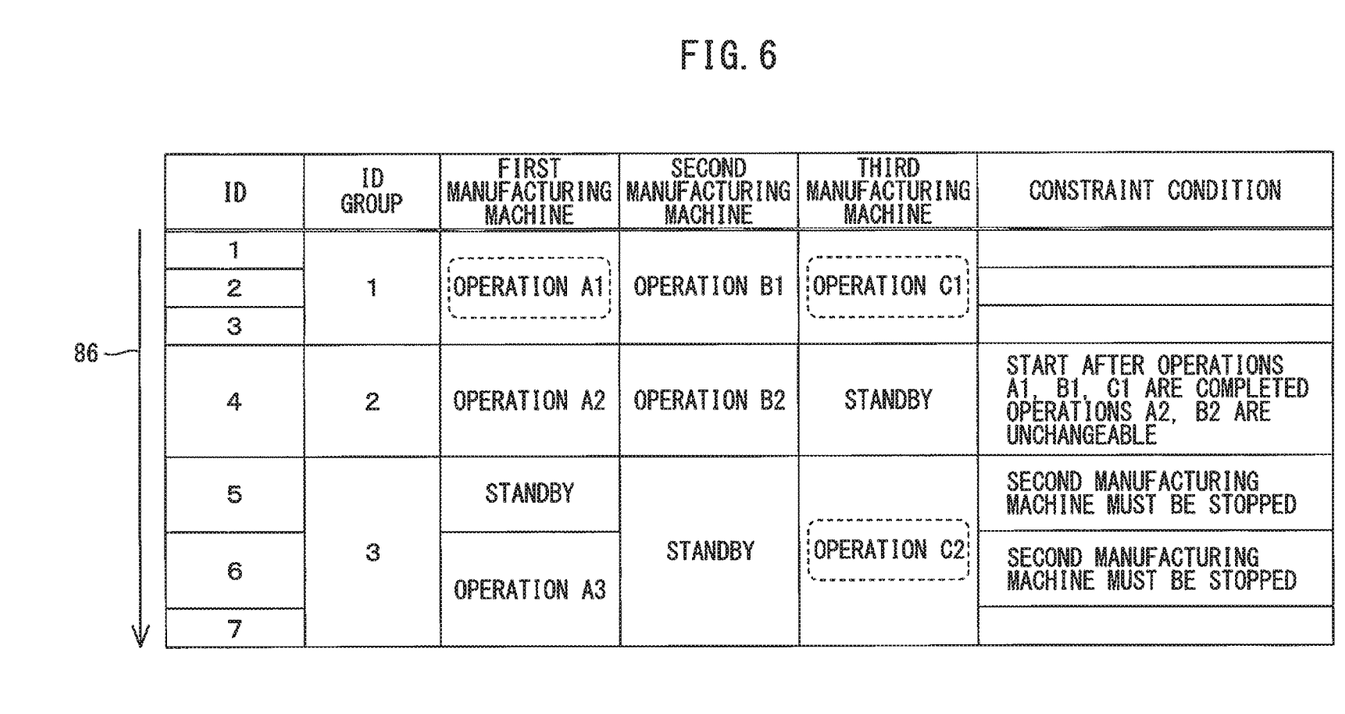
FIG. 6 is a table illustrating the operations of the manufacturing machines after an operation adjustment part adjusts the operations by the first control.

In FIG. 6, a table illustrating the operation of the manufacturing machines after the operation adjustment part adjusts the operation by the first control is illustrated. Referring to FIG. 4 and FIG. 6, before adjustment is performed, the third manufacturing machine 3c is in a standby state in the ID number of number 3. The third manufacturing machine 3c performs the operation C1 immediately before the standby state. Consequently, in steps 65, 66 in FIG. 5, a control for reducing the speed of the operation C1 is performed. Herein, the entire time of the standby state of the ID number of number 3 is provided to the operation C1. In such an occasion, since the constraint condition is added with respect to the ID number of number 4, the operation C1 is extended to the ID number of number 3. In FIG. 6, a state after the operation C1 is adjusted is illustrated.

Further, the third manufacturing machine 3c is in a standby state with respect to the ID number of number 7. The operation C2 is performed immediately before the standby state. Consequently, the speed of the operation is reduced in the operation C2 and an operation time is extended to the ID number of number 7.

The first manufacturing machine 3a is in a standby state with respect to the ID number of number 2 before adjustment. Consequently, in steps 65, 66 in FIG. 5, the speed of the operation is reduced, whereby a time for performing the operation A1 is extended to the ID number of number 2. Further, the first manufacturing machine 3a is in a standby state with respect to the ID number of number 3 before adjustment. Consequently, in the control for examining the ID number of number 3, an operation time of the operation A1 is extended to the ID number of number 3 in steps 65, 66 in FIG. 5. As a result, as illustrated in FIG. 6, the operation A1 is performed over the entire period from the ID number of number 1 to the ID number of number 3.

As illustrated in FIG. 6, in the operation A1, the operation C1, and the operation C2 as adjusted, the same operation is performed before and after adjustment, whereas the speed is reduced. A time needed for each operation becomes longer. Consequently, the power consumption supplied to the motor and the like which drives each manufacturing machine can be averaged, and the maximum power consumption of the manufacturing cell 2a can be reduced. In addition, the average power consumption of the manufacturing cell 2a can be reduced. Further, a radical operation and a rapid operation are avoided so that the component lifetime of the manufacturing machines can be extended. Note that a time needed for the entire operation after adjustment is identical to a time for the entire operation before adjustment. Thus, the operational load of the entire manufacturing cell can be reduced while the number of products manufactured in the predetermined period is maintained to be the same.

Next, the second control performed by the operation adjustment part according to the present embodiment will be described. In the second control, successive two ID groups are selected. A ratio of operation time is adjusted without changing a total operation time of the two ID groups.

Figure 7:
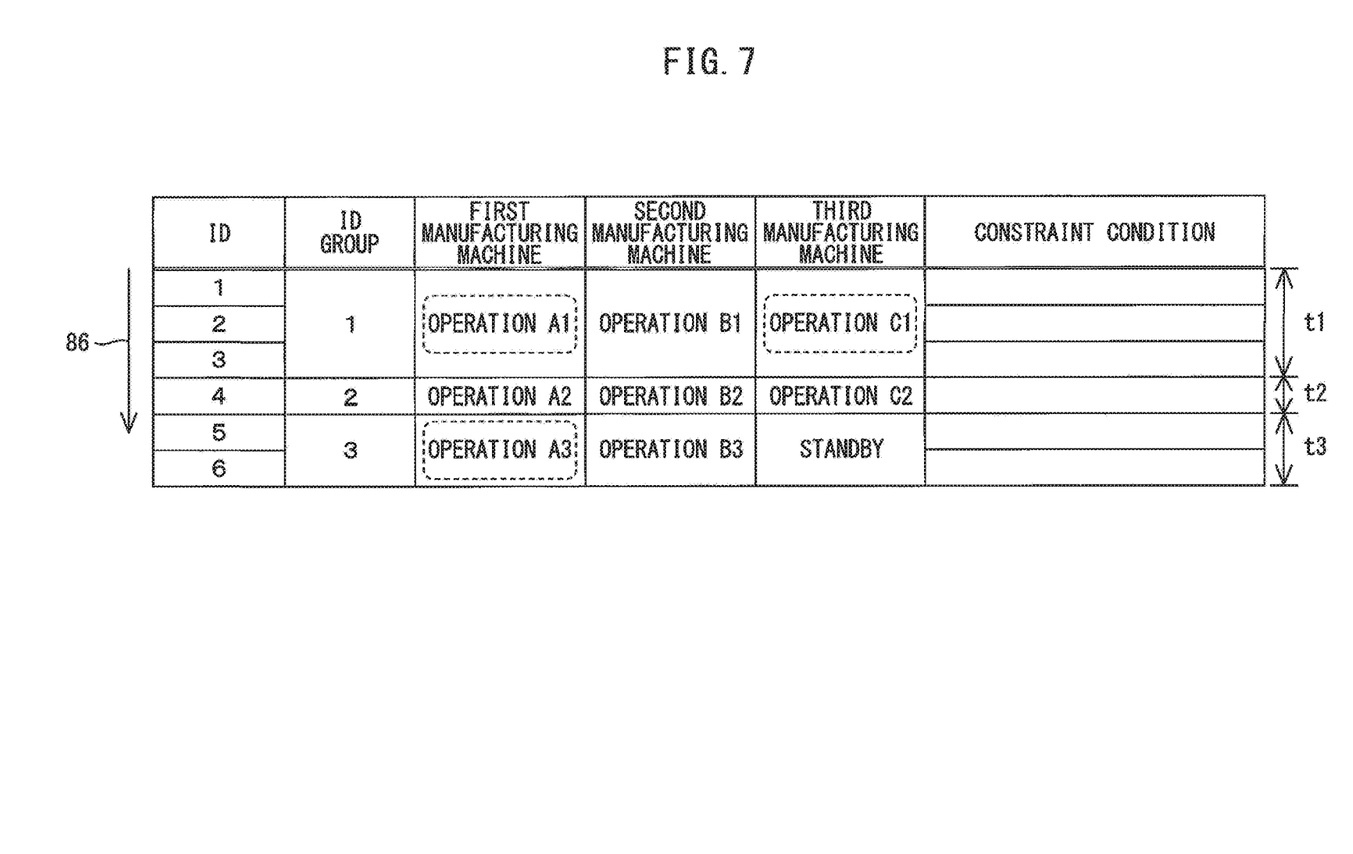
FIG. 7 is a table of the operations of the manufacturing machines which illustrates a control including second control according to the embodiment.

In FIG. 7, a table of the operation of the manufacturing machines which illustrates the second control according to the present embodiment is illustrated. FIG. 7 is a table illustrating the operation after the first control is performed. In an example herein, the ID numbers of number 1 to number 6 are set. The operations of the ID numbers of number 1 to number 3 are set as the first ID group. The operation of the ID number of number 4 is set as the second ID group. The operations of the ID numbers of number 5 to number 6 are set as the third ID group. In this example, due to the first control, time of the operation A1, the operation A3, and the operation C1 is lengthened.

The operations A1, B1, C1 of the first ID group are performed in a period from the ID number of number 1 to the ID number of number 3. The operations A1, B1, C1 are performed in an operation time t1. The operations A2, B2, C2 of the second ID group are performed in an operation time t2. Thus, the entire operation time needed for the operation of the ID numbers of number 1 to number 4 is (t1+t2).

In the second control according to the present embodiment, a control for changing a ratio of operation time of two ID groups in such a manner that a total time of the operation is not changed is performed. In such a case, the ratio of the operation time can be changed based on a predetermined rule. In the present embodiment, the operational load is calculated while a change is made for each predetermined time. As a result, when the operational load decreases, the control for changing the ratio of the operation time is continued. On the other hand, when the operational load increases, the control for changing the ratio of the operation time is terminated.

Figure 8:
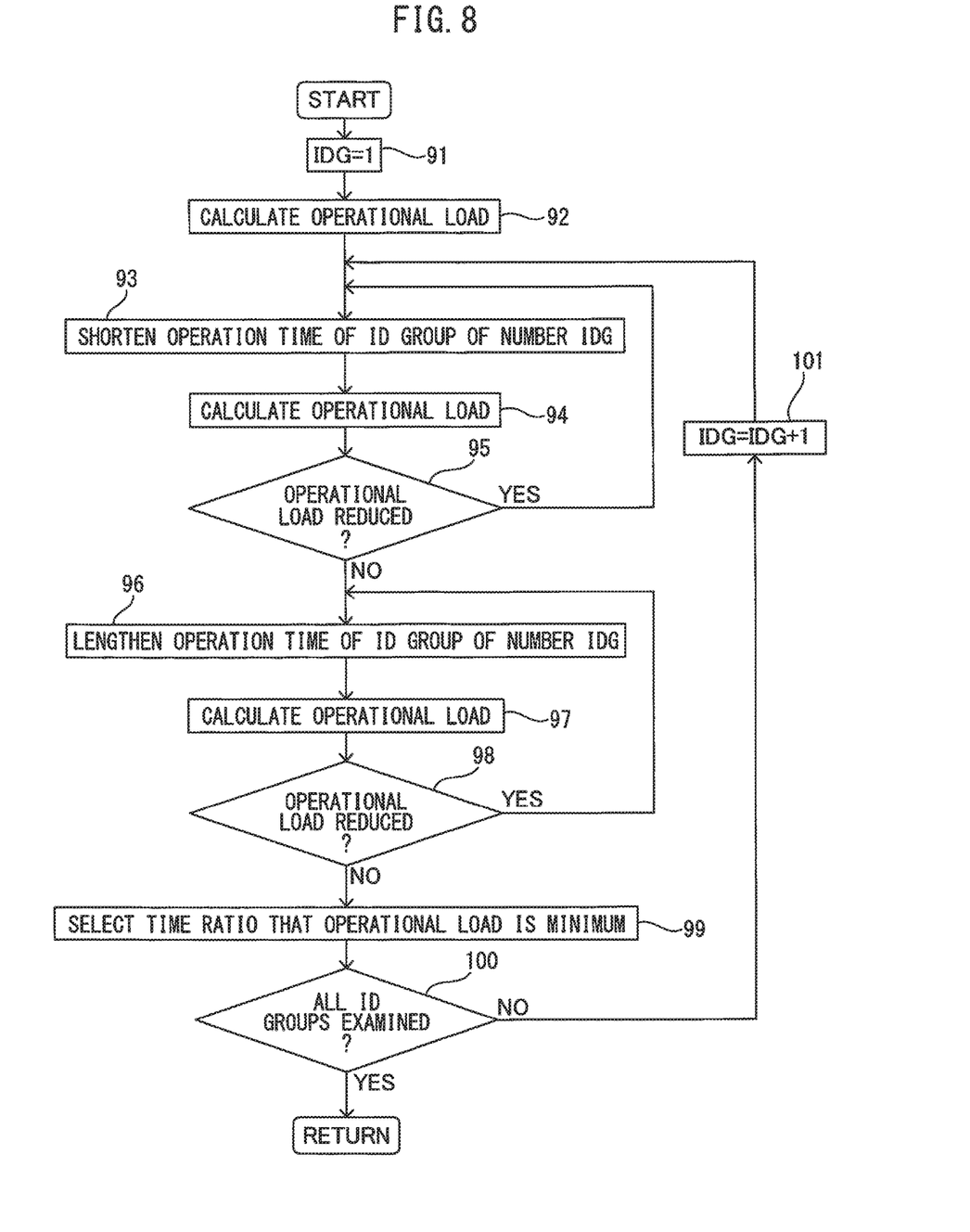
FIG. 8 is a flowchart of the control including the second control according to the embodiment.

In FIG. 8, a flowchart of a control including the second control performed by the operation adjustment part is illustrated. In step 91, the operation adjustment part 55 sets an ID group number IDG as 1. In other words, the operation adjustment part 55 selects the first ID group. Further, the operation adjustment part 55 selects the second ID group of the number subsequent to the number IDG. In step 92, the load calculation part 54 calculates the operational load in the predetermined period.

In step 93, the operation adjustment part 55 changes a time ratio without changing a total operation time of the ID group of the number IDG and the ID group of the number (IDG+1). For example, the operation adjustment part 55 performs such a control as to shorten a time of the operation time t1 of the first ID group and lengthen the operation time t2 of the second ID group.

The operation adjustment part 55 according to the present embodiment subtracts a predetermined time from the operation time t1 and adds the predetermined time to the operation time t2. In the operations A1, B1, C1 of the manufacturing machines which belong to the first ID group, the speed of the operation becomes high. Meanwhile, in the operations A2, B2, C2 of the manufacturing machines which belong to the second ID group, the speed of the operation becomes low.

The operation adjustment part 55 calculates the speed of the operation of each manufacturing machine based on the operation time as changed. The operation program generation part 56 generates new operation programs of the manufacturing machines 3a to 3c based on the speed as calculated. The operation program generation part 56 generates the operation program of the manufacturing machines 3a to 3c based on the operation after adjustment. The transmission part 57 transmits the operation programs to the machine control apparatuses 12 of the manufacturing machines 3a to 3c.

In step 94, the manufacturing machines 3a to 3c of the manufacturing cell 2a drive based on the operation program as changed. The load information acquisition part 53 of the cell control apparatus 5 acquires load information, and the load calculation part 54 calculates the operational load of the manufacturing cell in the predetermined period. The storage part 52 stores the operational load as calculated.

In step 95, the cell control apparatus 5 compares the operational load before adjustment and the operational load after adjustment in step 93. When the operational load after adjustment is smaller than the operational load before adjustment, the control proceeds to step 93. Further, the ratio of the operation time is changed in such a manner that the operation time of the ID group of the number IDG is short. Thereafter, the controls of steps 94, 95 are repeated.

In step 95, when the operational load after adjustment is larger than or equal to the operational load before adjustment, the control proceeds to step 96. Step 96 to step 98 are similar to step 93 to step 95 except that a process to change the ratio of the operation time is different.

In step 96, a control for changing the ratio in a manner reverse to step 93 is performed. The operation adjustment part 55 restores the operation time t1, t2 to an initial state as illustrated in FIG. 7. The operation adjustment part 55 performs such a control as to lengthen the operation time t1 and shorten the operation time t2. In such an occasion, the ratio is changed in such a manner that the total operation time (t1+t2) from a start of the ID number of number 1 to an end of the ID number of number 4 is not changed. The operation program generation part 56 generates an operation program of each of the manufacturing machines 3a to 3c based on the operation of the manufacturing machines 3a to 3c after adjustment.

In step 97, the manufacturing machines 3a to 3c of the manufacturing cell 2b drive based on the operation program as changed. The load information acquisition part 53 of the cell control apparatus 5 acquires load information, and the load calculation part 54 calculates the operational load of the manufacturing cell in the predetermined period at such a time. The storage part 52 stores the operational load as calculated.

In step 98, the cell control apparatus 5 compares the operational load before adjustment and the operational load after adjustment in step 96. When the operational load after adjustment is smaller than the operational load before adjustment, the control proceeds to step 96. Further, the ratio of the operation time is changed in such a manner that the operation time of the ID group of the number IDG is long. Thereafter, the control of steps 97, 98 is repeated. In step 98, when the operational load after adjustment is larger than or equal to the operational load before adjustment, the control proceeds to step 99.

In step 99, a time ratio in which the operational load is minimum is selected from the time ratios changed in step 93 to step 98. For example, when the first ID group and the second ID group are selected, the operational time of the first ID group and the operation time of the second ID group which minimize the operational load are selected. Further, the speed corresponding to the operation time is selected.

In step 100, it is determined whether or not all the ID groups have been examined. When a part of the ID groups is not examined, the control proceeds to step 101. In step 101, one is added to the number IDG. In other words, the following ID group is selected. The process returns to step 93, and the examination of the new ID group and the ID group subsequent to the new ID group is performed. For example, the operation adjustment part 55 performs adjustment of a ratio of the operation time t2 of the second ID group and an operation time t3 of the third ID group. In step 100, when the examination of all the ID groups has been terminated, the control is terminated.

In the second control according to the present embodiment, when the operational load does not change or increases, the operation adjustment part 55 terminates the examination. Alternatively, the operation adjustment part 55 changes the ratio of the operation time until a minimum point of the operational load appears. The change of the ratio of the operation time in steps 93, 96 is not limited to the configuration as described above, and an upper limit value or a lower limit value of a range of the change may be set in advance. If the range of the change exceeds the upper limit value or falls below the lower limit value after the operation time is changed, the control for changing the operation time can be terminated.

Thus, in the second control, the operation adjustment part 55 changes the ratio of the operation time without changing the total time of the operation time in the successive operation. The operation adjustment part 55 detects the operational load when the operation is performed in accordance with the operation time after adjustment. Thus, the operation adjustment part 55 detects the operational load while changing the operation time, and employs such an operation time as to minimize the operational load. By performing such a control, an operation time in which the operational load of the manufacturing cell is small can be selected. In other words, the operation adjustment part 55 can set the speed of the manufacturing machines in such a manner that the operational load of the manufacturing cell is small. Note that the ID groups on which the constraint condition is set can be removed from the successive operation.

In the first control and the second control as described above, the control for changing the speed of the operation is performed. The embodiment is not limited to this and a control for changing the acceleration of the operation may be performed. Alternatively, both the speed and the acceleration may be changed. In such a case, a relational equation of an amount of change of the speed and an amount of change of the acceleration may be set in advance. Both the speed and the acceleration can be changed based on the relational equation. Alternatively, one of the speed or the acceleration may be changed earlier, and then the other may be changed. For example, when a standby time remains after the acceleration is reduced in accordance with a predetermined range, a control for reducing the speed may be performed.

As the operational load, the average power consumption or the maximum power consumption can be selected. In such a case, the load calculation part can calculate the average power consumption or the maximum power consumption of the entire manufacture cell as selected.

Further, the variable indicating the component lifetime such as the rated lifetime ratio as described above can be selected as the operational load. In such a case, a target component of the manufacturing machines is selected in advance. A value of the variable indicating a lifetime separately for each component is calculated. In the first control, from components mounted to the manufacturing machines, a value in which a remaining lifetime is the shortest can be selected as the variable indicating the lifetime of the component. For example, from the rated lifetime ratio of the speed reducers mounted to a plurality of manufacturing machines of the manufacturing cell, a maximum value can be selected as the variable indicating the lifetime. Further, in the second control, the time ratio in which remaining lifetime is the longest can be selected from components mounted to the manufacturing machines. For example, the time ratio can be selected such that a maximum value is small from the rated lifetime ratio of the speed reducers mounted to a plurality of manufacturing machines of the manufacturing cell. By adopting this control, components can be used for a long time, and a time of exchanging components can be delayed. Note that the load calculation part may perform a control for calculating the operational load by simulation after changing the time ratio.

Further, in the evaluation of the operational load in the second control, from the average power consumption, the maximum power consumption, and the variables indicating the component lifetime of the manufacturing cell, a plurality of variables may be selected in order to perform evaluation. For example, when two or more operational loads are evaluated at the same time, an evaluation function can be generated in advance using a weight which indicates a degree of importance of each operational load. A control can be made such that the evaluation function is small. Alternatively, a priority order for a plurality of operational loads may be created and the operational loads may be evaluated in the priority order. For example, after adjustment is made such that the maximum power consumption is not greater than a determination value, adjustment for reducing the average power consumption may be performed. The determination value at such an occasion may be set in such a manner as to change in accordance with the predetermined variable. For example, the electricity rate depends on a time at which electricity is used. Thus, the determination value may be set in such a manner as to reduce the maximum power consumption at a time at which the electricity rate is high.

Referring to FIG. 1 and FIG. 2, the production planning apparatus 6 sets a manufacturing plan of products in the manufacturing system 1 according to the present embodiment. The production planning apparatus 6 transmits a plan of manufacturing by the manufacturing machines 3*a* to 3*e* to the cell control apparatus 5. The cell control apparatus 5 is provided with a manufacturing number acquisition part 58 which receives a command on a number of products manufactured in the predetermined period (quantity of production as needed) from a production planning apparatus 6. The command on the number of products manufactured as received by the manufacturing number acquisition part 58 is stored in the storage part 52.

The operation adjustment part 55 according to the present embodiment can set a number of products manufactured in the predetermined period in such an extent that the number of products manufactured, as received by the manufacturing number acquisition part 58, can be manufactured. The operation adjustment part 55 can set a manufacturing number no less than the manufacturing number as received by the manufacturing number acquisition part 58. The operation adjustment part 55 can adjust the operation of each manufacturing machine. In such an occasion, the operation adjustment part 55 can perform the first control and the second control in such a manner as to reduce the operational load in such an extent that the number of products manufactured as set fails to change.

For example, the operation time, the speed, and the acceleration of each manufacturing machine are set by performing the first control and the second control as described above. A time needed to manufacture products in the manufacturing cell can be detected. Further, the actual number of products manufactured in the predetermined period can be calculated.

Herein, there are cases in which the actual number of products manufactured in the predetermined period is greater than the planned manufacturing number received by the manufacturing number acquisition part 58. In such a case, the operation adjustment part 55 can further reduce at least one of the speed and the acceleration of the manufacturing machines and perform the control for adjusting the operation time. For example, the operation adjustment part 55 sets the planned manufacturing number received by the manufacturing number acquisition part 58 as the number of products manufactured in the predetermined period. The operation adjustment part 55 calculates a coefficient in which the actual manufacturing number is divided by the planned manufacturing number received by the manufacturing number acquisition part 58. The operation adjustment part 55 can multiply the operation time of all the manufacturing machines by the coefficient. For example, the operation time of all the ID groups is multiplied by the coefficient so that the operation time can be lengthened. The operation adjustment part 55 can set the speed and the acceleration in accordance with the operation time as calculated.

When there is a room for the speed at which products are manufactured, the operational load can be further reduced by performing such a control. In the control for adjusting the operation time, a control for lengthening the operation time of an arbitrary operation can be performed. For example, the operation adjustment part 55 may select the ID group in which the operational load is large and perform a control for lengthening the operation time of the ID group as selected.

Further, there are cases in which due to the change of the planned manufacturing number, the planned manufacturing number in the predetermined period increases. In such a case, the operation adjustment part 55 may perform a control for shortening the operation time of the manufacturing machines based on the current manufacturing number and the planned manufacturing number in the predetermined period.

Note that in the embodiment as described above, the operation adjustment part performs the first control and the second control, and then sets the number of products manufactured in the predetermined period. The embodiment is not limited to this, and the operation adjustment part can perform the first control and the second control, while setting the number of products manufactured in the predetermined period. For example, the operation adjustment part may set the operation of the manufacturing machines based on the planned manufacturing number obtained by the manufacturing number acquisition part, and then perform the first control and the second control. Further, in the embodiment as described above, a command on the number of products manufactured is received from the production planning apparatus. The embodiment is not limited to this, and the operator may input through the input part a command on the number of products manufactured in the predetermined period.

In the present embodiment, both the first control and the second control are performed. The embodiment is not limited to this, and either one of the controls may be performed.

In the manufacturing system according to the present embodiment, a plurality of manufacturing cells are set. The embodiment is not limited to this, and the number of manufacturing cells may be one. For example, referring to FIG. 2, the manufacturing machines 3a to 3e may be set in one manufacturing cell. Further, in the present embodiment, the machine control apparatus of each manufacturing machine is connected directly to the cell control apparatus. The embodiment is not limited to this, and each manufacturing cell may be provided with a PLC (programmable logic controller). The cell control apparatus may be connected to the programmable logic controller and the programmable logic controller may be connected to the machine control apparatuses.

According to the present invention, the manufacturing management apparatus which reduces a load of the entirety of manufacturing machines can be provided.

In each control as described above, the order of the steps can be appropriately changed as long as the functions and effects are not changed. The embodiments as described above can be combined as appropriate.

In each drawing as described above, identical reference signs are provided to identical or equivalent parts. Note that the embodiments as described above are exemplary and not to limit the present invention. Further, modifications of the embodiments recited in the claims are included in the embodiments.

The invention claimed is:

1. A manufacturing management apparatus which controls a manufacturing cell including a plurality of manufacturing machines, the apparatus comprising:
   a load information acquisition part that acquires load information including at least one of a power consumption and information relating to a component lifetime of each manufacturing machine in a time-series manner;
   a load calculation part which calculates an operational load including at least one of an average power consumption, a maximum power consumption, and a variable indicating a component lifetime of the manufacturing cell in a predetermined period based on the load information;
   an operation adjustment part which performs first control for reducing at least one of a speed and an acceleration at which the manufacturing machine drives and second control for adjusting a ratio of time of successive operations in such a manner as to reduce the operational load in such an extent that the number of products manufactured in the predetermined period is not changed; and a transmission part which transmits a command on the operation adjusted by the operation adjustment part to the manufacturing machines.

2. The manufacturing management apparatus according to claim 1, further comprising a manufacturing number acquisition part which receives a command on the number of products manufactured from a production planning apparatus which sets a manufacturing plan of products, wherein the operation adjustment part sets the number of products manufactured in the predetermined period in such an extent that the number of products manufactured, as received by the manufacturing number acquisition part, can be manufactured, and performs the first control and the second control in such a manner as to reduce the operational load.

3. The manufacturing management apparatus according to claim 1, configured in such a manner as to control a plurality of manufacturing cells, wherein the operation adjustment part performs the first control and the second control for each of the manufacturing cells in a separate manner.

* * * * *